United States Patent [19]

Kajikawa

[11] Patent Number: 5,191,187
[45] Date of Patent: Mar. 2, 1993

[54] LASER MACHINING DEVICE WHEREIN A POSITION REFERENCE LASER BEAM IS USED BESIDES A MACHINING LASER BEAM

[75] Inventor: Toshikazu Kajikawa, Tokyo, Japan

[73] Assignee: NEC Corporation, Tokyo, Japan

[21] Appl. No.: 718,514

[22] Filed: Jun. 21, 1991

[30] Foreign Application Priority Data

Jun. 21, 1990 [JP] Japan .................. 2-163717

[51] Int. Cl.⁵ ............................................ B23K 26/00
[52] U.S. Cl. .......................... 219/121.76; 219/121.83
[58] Field of Search .................. 219/121.76, 121.67,
219/121.72, 121.78, 121.83, 121.68, 121.69

[56] References Cited

U.S. PATENT DOCUMENTS

| | | | |
|---|---|---|---|
| 4,734,558 | 3/1988 | Nakano et al. | 219/121 LP |
| 4,758,848 | 7/1988 | Nakano | 219/121.67 X |
| 4,818,835 | 4/1989 | Kuwabara et al. | 219/121.6 |
| 4,920,364 | 4/1990 | Andrews et al. | 346/108 |

FOREIGN PATENT DOCUMENTS 0217077 4/1987 European Pat. Off. .
0236008 9/1987 European Pat. Off. .

OTHER PUBLICATIONS

Applied Optics, vol. 18, No. 4, Feb. 15, 1979, pp. 496-500, R. C. Oehrle "Galvanometer beam-scanning system for laser fiber drawing".

Primary Examiner—C. L. Albritton
Attorney, Agent, or Firm—Sughrue, Mion, Zinn, Macpeak & Seas

[57] ABSTRACT

A laser machining device comprises a position reference laser beam source (16) in addition to a machining laser beam source (11). A galvanometer scanner (13) has two reflecting surfaces, one for directing a machining laser beam to an object (14) as a machining beam spot and the other for directing a position reference laser beam as a position reference beam spot to a position reference pattern displayed on a liquid crystal display panel (18). The machining beam spot scans a surface of the object to treat the surface according to a machining pattern, to which the position reference pattern is transferred. When a common table (15) is used, transfer is preferably carried out in a ratio of one to one. It is possible to make an additional table carry the panel separately from the galvanometer and the object. In either event, the machining laser beam can have a higher power than the position reference laser beam.

5 Claims, 5 Drawing Sheets

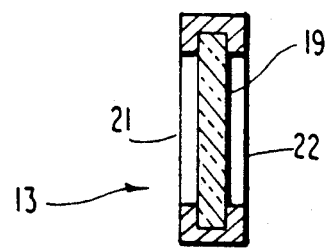
FIG. 2
FIG. 5
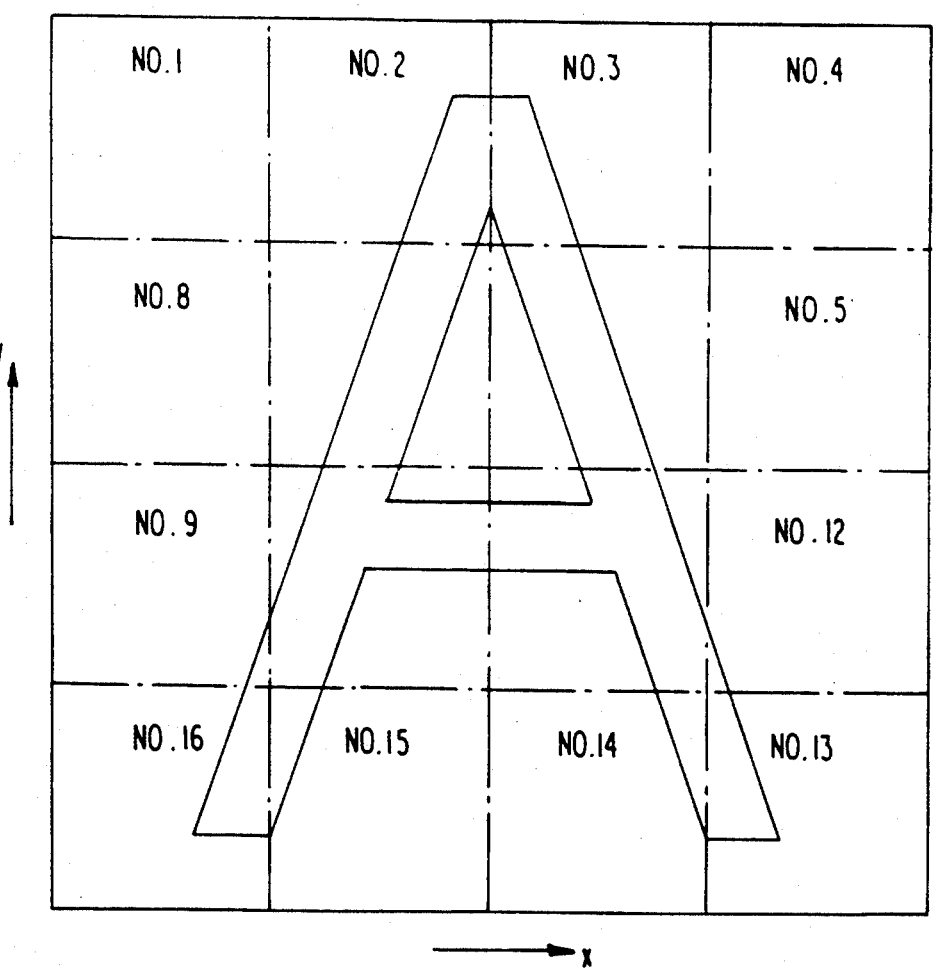

LASER MACHINING DEVICE WHEREIN A POSITION REFERENCE LASER BEAM IS USED BESIDES A MACHINING LASER BEAM

BACKGROUND OF THE INVENTION

This invention relates to a laser machining device for machining an object or workpiece by a laser beam and, more particularly, to a pattern transfer device for use typically in either a laser marker or a pattern generator.

Various laser machining devices are known. An example is disclosed in U.S. Pat. No. 4,734,558 issued to Masakazu Nakano and assigned to NEC Corporation, Japan, the present assignee. Another example is revealed in U.S. patent application Ser. No. 590,837 filed Oct. 1, 1990, by Koji Wakabayashi for assignment to the instant assignee based on a patent application filed in Japan under Patent Application No. 254,126 of 1989. Still another example will later be described. When used to machine or treat the object, the laser beam is herein called a machining laser beam.

According to the above-cited Nakano patent, a laser machining device comprises a machining laser oscillator which generates a machining laser beam along a machining laser beam axis when excited. A table or worktable is for carrying the object and for controllably moving the object relative to the machining laser beam axis. A liquid crystal display (LCD) is for displaying a position reference pattern which is typically an on-off or transparent-opaque pattern and provides a machining pattern on the object. The machining laser beam machines the objects in accordance with the machining pattern.

According to the above-referenced Wakabayashi patent application, a laser machining device comprises a machining laser beam source which generates a machining laser beam along a machining laser beam axis when a machining laser oscillator is placed therein and excited. A table is for carrying the object and is controllably subjected to displacement or movement relative to the machining laser beam axis. A data signal producing unit is coupled to the table and is for producing, in response to the relative displacement of the table, data signals collectively representative of a machining pattern. An acousto-optic modulator unit is placed along the machining beam axis and is for modulating the machining laser beam in compliance with the data signals to make the machining laser beam machine the object in accordance with the machining pattern.

An excellent Q switch is disclosed in U.S. Pat. No. 3,437,073 issued to John F. Forkner. In the laser machining device according to Wakabayashi, two such Q switches are preferably used in the acousto-optic modulator unit. In addition, such a Q switch is more preferably used additionally in the machining laser beam source to on-off control the machining laser beam. In this event, the machining laser beam source is for controllably generating the machining laser beam.

The laser machining device of Wakabayashi is of an acousto-optic modulator type. Generally speaking, a laser machining device of the acousto-optic modulator type is operable at a high machining speed.

The laser machining device of Nakano is of a liquid crystal display mask transfer type. A conventional laser machining device of the liquid crystal display mask transfer type is advantageous in that it is possible to vary the shape of the position reference pattern as desired. The fact should, however, be noted that the machining laser beam is directly incident on the liquid crystal display. The machining laser beam mast have a wavelength range compatible with the liquid crystal display. In addition, the machining laser beam must have a weak energy density on the liquid crystal display so as not to damage the liquid crystal display. This results in a low machining speed.

SUMMARY OF THE INVENTION

It is therefore an object of the present invention to provide a laser machining device operable to machine an object with a machining pattern of a desired shape.

It is another object of this invention to provide a laser machining device which is of the type described and which has a high machining speed.

Other objects of this invention will become clear as the description proceeds.

According to this invention, there is provided a laser machining device which is for machining an object by a machining laser beam and which comprises: (A) a machining laser beam source for controllably generating the machining laser beam; (B) a position reference laser beam source for generating a position reference laser beam; (C) display means for displaying a position reference pattern for allowing passage of the position reference laser beam with a variable beam intensity; (D) scanning means for scanning the object by the machining laser beam and the position reference pattern by the position reference laser beam so that the object is scanned at a machining position corresponding to a reference position at which the position reference laser beam is incident on the position reference pattern and through which the position reference laser beam passes to become an intensity variable laser beam having the variable beam intensity; (E) a photodector for detecting the intensity variable laser beam to produce a detection signal representative of the variable beam intensity; and (F) control means supplied with the detection signal for controlling the machining laser beam source to make the machining laser beam source generate the machining laser beam when the variable beam intensity is greater than a threshold beam intensity.

BRIEF DESCRIPTION OF THE DRAWING

FIG. 2 is a schematic vertical sectional view of a galvanometer scanner for use in the laser machining device shown in FIG. 1;

FIG. 5 exemplifies an original pattern, pattern blocks of which should be displayed one at a time as a position reference pattern on a liquid crystal display panel for use in the laser machining device depicted in FIG. 1.

DESCRIPTION OF THE PREFERRED EMBODIMENTS

Figure 1:
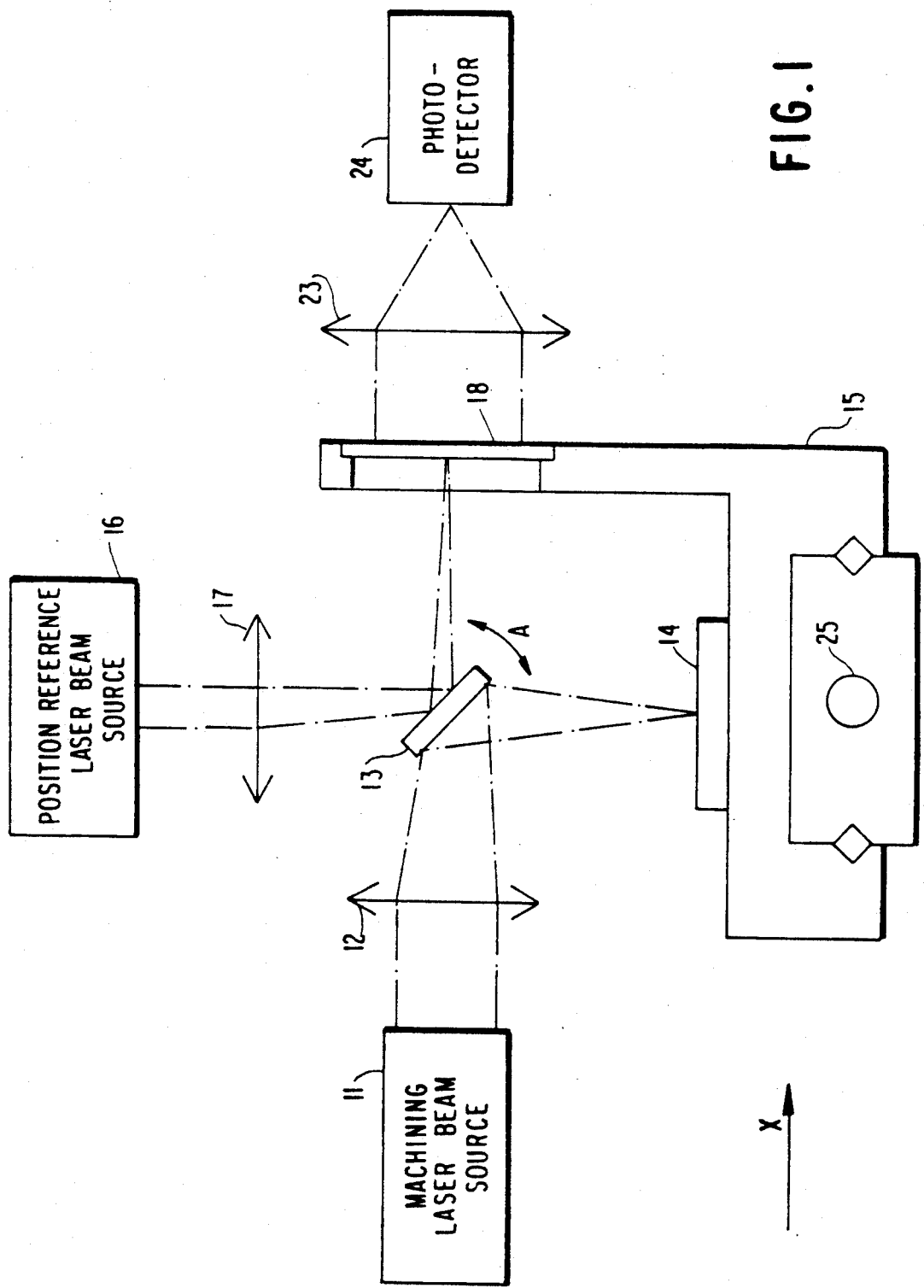
FIG. 1 is a schematic side view of a laser machining device according to a first embodiment of the instant invention.

Referring to FIG. 1, attention will be directed to a laser machining device according to a first embodiment of the present invention. In the laser machining device, a machining laser beam source 11 comprises a Q switch (not shown) and controllably generates a machining laser beam when a machining laser oscillator (not shown) is positioned therein and excited through the Q switch. A machining condenser lens 12 is for directing the machining laser beam to a galvanometer scanner 13 having first and second reflecting surfaces in the manner which will presently be described. The galvanometer scanner 13 is clockwise and counterclockwise swingable about an axis of swing in the manner indicated by an arc which has bidirectional arrowheads and is labelled A. The machining condenser lens 12 has a machining lens optical axis which perpendicularly passes through the axis of swing.

Reflected at the first reflecting surface of the galvanometer scanner 13, the machining laser beam is directed to an object surface of an object or workpiece 14 carried by a table or worktable 15. The machining laser beam is focussed by the machining condenser lens 12 on the object surface as a machining beam spot or dot having a diameter of about from 20 to 30 microns. When the golvanometer scanner 13 swings, the machining beam spot scans the object surface in an X-axis direction which is indicated by an arrow labelled X and which an orthogonal XY coordinate plane has. Neglecting swing of the galvanometer scanner 13, the machining laser beam reaches the object surface substantially perpendicular to the machining lens optical axis.

A position reference laser beam source 16 is for generating a position reference laser beam when a position reference laser oscillator (not shown) is positioned therein and continuously excited. A position reference condenser lens 17 directs the position reference laser beam to the galvanometer scanner 13. Reflected by the second reflecting surface, the position reference laser beam is directed to a liquid crystal display (LCD) panel 18 carried by the table 15.

The liquid crystal display panel 18 is for displaying a position reference pattern which is typically an on-off or transparent-opaque pattern for allowing passage of the position reference laser beam with a locally variable beam intensity which depends on a reference position of incidence of the position reference laser beam onto the position reference pattern. Like in other laser machining devices of the liquid crystal display mask transfer type, the liquid crystal display panel 18 is used as a mask for transferring or projecting the position reference pattern onto the object surface of the object 14 as a machining pattern, in accordance with which the machining laser beam scans the object surface at a machining position to machine the object surface. It should, in contrast, be noted in connection with this invention that the position reference pattern is so named because the position reference pattern is transferred into the machining pattern in a quite novel and unique fashion which will become clear very soon.

More particularly, the liquid crystal display panel 18 is preferably that illustrated in the above-referenced Nakano patent with reference to FIGS. 7 to 9 thereof. For use in the laser machining device according to this invention, the liquid crystal display panel 18 may have a total size given by a height of about 10 mm and a Y-direction total size or width of about 10 mm. It is nevertheless possible to use a wider liquid crystal display panel. Each of picture elements of such a liquid crystal display panel may have a picture element size of about 0.2 mm square.

The pattern reference condenser lens 17 has a position reference lens optical axis which perpendicularly passes through the axis of swing of the galvanometer scanner 13. The position reference laser beam is focussed by the position reference condenser lens 17 on the position reference pattern as a position reference beam spot having a diameter of from about 20 to 30 microns. When the galvanometer scanner 13 swings, the position reference beam spot scans the position reference pattern vertically in the figure. Again neglecting swing of the galvanometer scanner 13, the position reference laser beam proceeds from the galvanometer scanner 13 to the position reference pattern substantially parallel to the machining lens optical axis.

It is now understood that the liquid crystal display panel 18 serves as a principal element of a displaying arrangement or section of the laser machining device being illustrated. The displaying arrangement is for displaying the position reference pattern for allowing passage of the position reference laser beam at the reference position with the variable beam intensity. More specifically, the position reference laser beam passes through the reference position to become an intensity variable laser beam having the variable beam intensity.

It is furthermore understood that the galvanometer scanner 13 serves as a principal element of a scanning arrangement or section of the laser machining device. The scanning arrangement is for scanning the object surface of the object 14 by the machining laser beam at the machining position and the position reference pattern of the displaying arrangement by the position reference laser beam at the reference position.

The scanning and the position reference lens optical axes may alternatively be called first and second optical axes. The machining and the position reference condenser lenses 12 and 17 are not essential parts of the laser machining device insofar as this invention is concerned with. In the example being illustrated, the first and the second optical axes are perpendicular to each other. It is therefore possible under the circumstances to say as follows. The machining laser beam source 11 directs the machining laser beam to the first reflecting surface of the galvanometer scanner 13 along the first optical axis. The position reference laser beam source 16 directs the position reference laser beam to the second reflecting surface along the second optical axis. The galvanometer scanner 13 directs the machining laser beam from the first reflecting surface to the machining pattern or to the object surface of the object 14 substantially parallel to the second optical axis and the position reference laser beam from the second reflecting surface to the position reference pattern substantially along the first optical axis.

Inasmuch as the galvanometer scanner 13 alone is used in this manner, the machining position corresponds to the reference position. It will therefore be appreciated that the liquid crystal display panel 18 is not scanned by the machining laser beam but by the position reference laser beam. In order to take this fact into due consideration, it will be mentioned that a machining optical system comprises the machining laser beam source 11, the machining condenser lens 12, and the first reflecting surface of the galvanometer scanner 13 and that a position referring optical system comprises the position reference laser beam source 16, the positon reference condenser lens 17, and the second reflecting surface of the galvanometer scanner 13. According to this invention, the machining and the position referring optical systems are two separate optical systems. This enables, among others, to use a high-power machining laser beam and a low-power position reference laser beam. For example, the machining laser beam may have a power of about 1 mj per pulse. The position reference laser beam may have a power of about 1 mW in continuous wave oscillation.

Turning to FIG. 2 during a short while, the galvanometer scanner 13 comprises a scanner body 19 having two principal surfaces and the first and the second reflecting surfaces which are indicated at 21 and 22 and are contiguous to the respective principal surfaces of the scanner body 19. It will be presumed that the machining and the position reference laser beams have machining and position reference beam wavelengths. The first reflecting surface 21 is implemented by a total reflection coating for an optical beam having the machining beam wavelength and the second reflecting surface 22, by another total reflection coating for an optical beam of the position reference beam wavelength. The galvanometer scanner 13 should preferably be circular when viewed perpendicularly of the first and the second reflecting surfaces 21 and 22. Its diameter should be sufficient to receive converging laser beams which have passed through the lenses 12 and 17 to be incident on the first and the second reflecting surfaces 21 and 22.

Turning back to FIG. 1, and intensity variable beam condenser lens 23 is for directing the intensity variable laser beam as a converging laser beam to a photodetector or optical detector 24. Detecting the intensity variation of laser beam, the photodetector 24 produces an electric detection signal representative of the variable beam intensity. The table 15 is driven or fed by a Y drive motor 25 in a Y-axis direction of the orthogonal XY coordinate plane.

Figure 3:
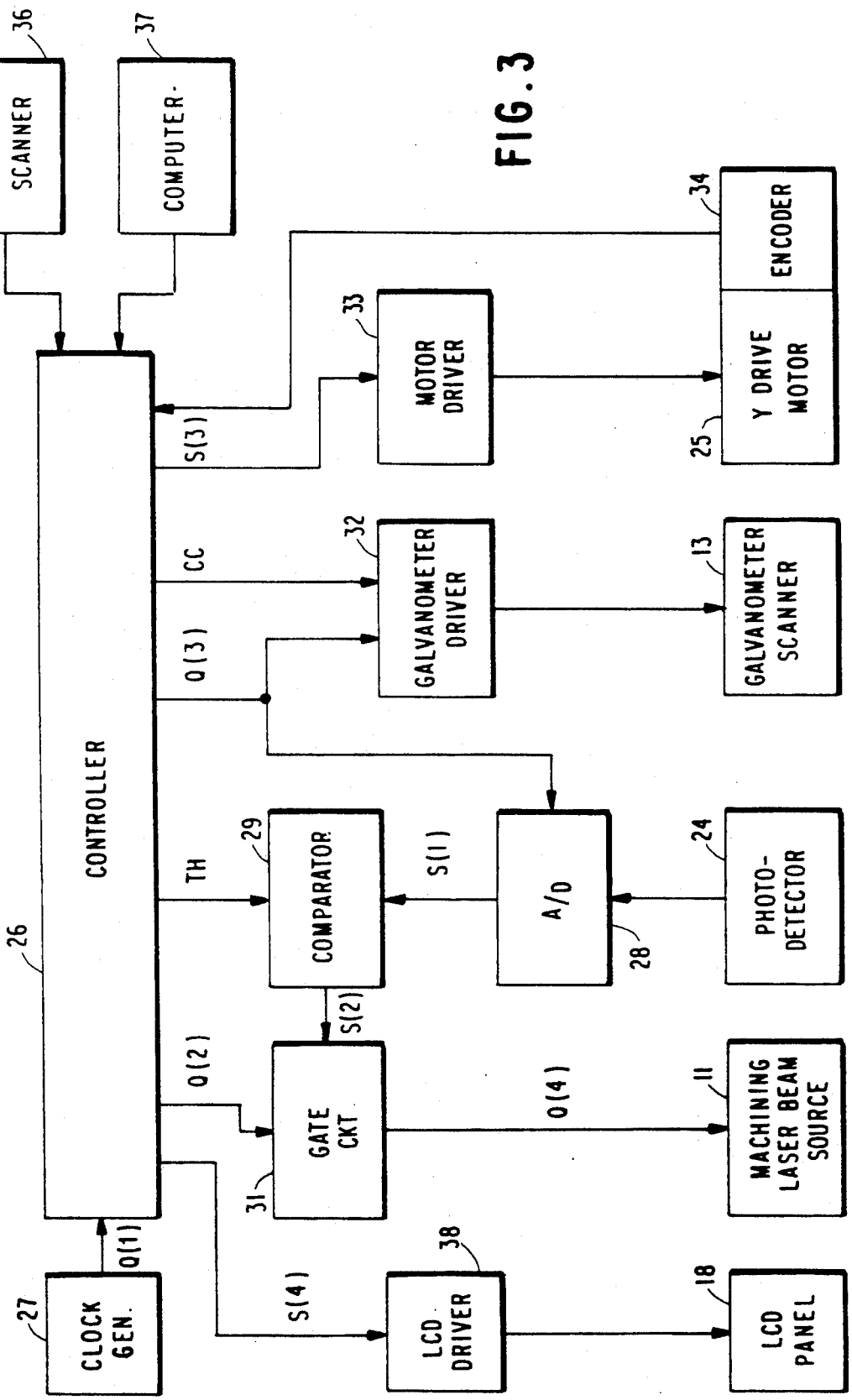
FIG. 3 is a block diagram of the laser machining device illustrated in FIG. 1.
Figure 4:
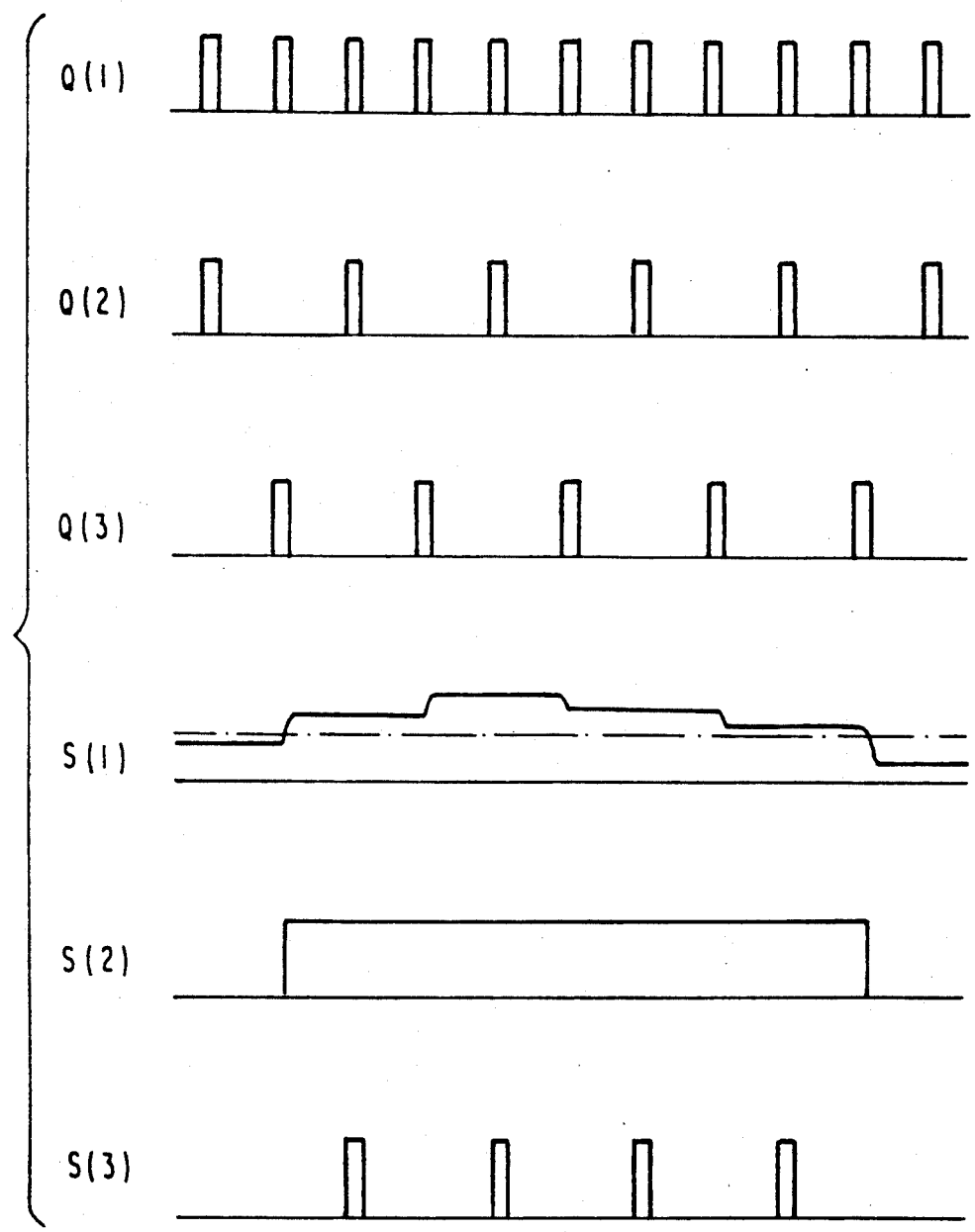
FIG. 4 is a schematic time chart for use in describing operation of the laser machining device illustrated in FIG. 1.

Referring now to FIGS. 3 and 4 in addition to FIG. 1, the laser machining device comprises a controller 26 operable in the manner which will become clear as the description proceeds. A clock generator 27 supplies the controller 26 with a sequence of device clock pulses Q(1) depicted along a first or top line in FIG. 4. The controller 26 comprises a frequecy divider (not shown) for frequency dividing the device clock pulses into frequency divided pulses, which the controller 26 alternatingly produces as switching clock pulses Q(2) of a sequence and swinging clock pulses Q(3) of another sequence in the manner illustrated along second and third lines in FIG. 4. The device clock pulses may have a clock frequency of, for example, 10 kHz. The switching and the swinging clock pulses may have a common clock frequency of 5 kHz when the clock frequency of the device clock pulses is 10 kHz.

From the photodetector 24, the detection signal is supplied to an analog-to-digital converter (A/D) 28. Using the swinging clock pulses Q(3) as sampling pulses, the converter 28 produces a digital intensity signal S(1) representative of the variable beam intensity in the manner exemplified along a fourth line in FIG. 4. A comparator 29 is for comparing the digital intensity signal with a threshold signal TH which is produced by the controller 26 to have a threshold level exemplified along the fourth line in FIG. 4 by a dash-dot line. The comparator 29 therebly produces a comparison result signal S(2) variable between binary one and zero levels in the manner illustrated along a fifth line in FIG. 4.

A gate circuit 31 is supplied from the controller 26 with the switching clock pulses Q(2) and from the comparator 29 with the comparison result signal S(2). Only when the comparison result signal has the binary one level, the gate circuit 31 delivers the switching clock pulses to the Q switch of the machining laser beam source 11 as activating pulses Q(4) in the manner illustrated along a sixth or bottom line in FIG. 4. The machining laser beam is generated from the machining laser beam source 11 in synchronism with the activating pulses.

It is now understood that a combination of the controller 26 together with its frequency divider, the clock generator 27, and circuit elements 28, 29, and 31 serves as a control arrangement or section of the laser machining device being illustrated. Supplied with the detection signal from the photodetector 24, the control arrangement is operable to control the machining laser beam source 11 so as to make the machining laser beam source 11 generate the machining laser beam when the variable beam intensity of the intensity variable laser beam is greater than a threshold beam intensity dependent on the shreshold level represented by the threshold signal TH.

A little more in detail, the control arrangement comprises a combination of the controller 26 with its frequency divider and the clock generator 27 as a clock generating unit for generating the switching clock pulses Q(2) as a sequence of clock pulses. In the control arrangement, a combination of the controller 26 with a source (not shown) of the threshold signal TH, the analog-to-digital converter 28, the comparator 29, and the gate circuit 31 serves as a gating unit which is supplied with the detection signal to gate the last-mentioned clock pulses and to produce an intermittent sequence of the activating pulses Q(4). A connection labelled Q(4) is included in the control arrangement and is operable as a supplying unit for suppling the activating pulses Q(4) to the machining laser beam source 11 to make the machining laser beam source 11 generate pulses of the machining laser beam in synchronism with the activating pulses Q(4).

For convenience of the discription which follows, it may be mentioned here that the object surface of the object 14 is spaced apart a first distance l1 from the axis of swing of the galvanometer scanner 13 and the position reference pattern of the liquid crystal display panel 18, a second distance L2 from the axis of swing. In the illustrated example, the first and the second distances are equal to each other.

A galvanometer driver 32 is supplied with the swinging clock pulses Q(3) from the controller 26. Controlled by a clockwise-counterclockwise swing command CC supplied from the controller 26 in the manner which will shortly be described, the galvanometer driver 32 gives a clockwise or counterclockwise unit angle of swing to the galvanometer scanner 13 when supplied with each of the swinging clock pulses. It will readily be understood that the unit angle of swing is determined in consideration of the second distance L2 and the picture element size of the liquid crystal display panel 18. Inasmuch as the first distance L1 is equal to the second distance L2 in the illustrated example, the unit angle of swing is alternatively determined by the first distance L1 and a resolving power of scan of the machining beam spot on the object surface of the object 14.

The galvanometer driver 32 comprises an up-down counter (not shown). Controlled by the clockwise-counterclockwise swing command CC, the up-down counter uses the swinging clock pulses Q(3) in counting up and down an up-down count from an initial count which may be equal to zero. A digital-to-analog converter (not shown) is used in the galvanometer driver 32 in converting the up-down count to a galvanometer positioning signal for positioning the galvanometer scanner 13 at an angular position corresponding to the up-down count. It is possible to select the unit angle of swing by strengthening and weakening the galvanometer positioning signal produced by the digital-to-analog converter per unit pulse of the swinging clock pulses.

Merely for convenience of the description, it will temporarily be assumed that the up-down counter is included in the controller 26 rather than in the galvanometer driver 32. When the up-down count reaches a first and a second predetermined count, the controller 26 sends a driving signal S(3) to a motor driver 33 for use in driving the Y drive motor 25. In this manner, the table 15 is given a unit displacement in the Y-axis direction. An encoder 34 is mechanically coupled to the Y drive motor 25 to detect completion of the unit displacement of the table 15 and to make the controller 26 stop supply of the drive signal to the motor driver 33.

The clockwise-counterclockwise swing command CC alternatingly indicates count up and down of the up-down count every time when the unit displacement is given to the table 15. It will readily be understood that the first and the second predetermined counts are determined in consideration of the second distance L2 and the Y-axis total size of the liquid crystal display panel 18. The unit displacement is determined in consideration of the speed and the precision of machining. When the machining beam spot is from 20 to 30 microns in diameter, it is possible to select the unit displacement typically between about 10 and 100 microns.

In practice, the unit angle of swing is determined so that the machining laser beam may scan the object surface of the object 14 with a scan resolving power of about 10 microns when the galvanometer scanner 13 is given the unit angle of swing by each of the swinging clock-pulses Q(3). It is now understood that a combination of the controller 26 with its frequency divider and up-down counter, the clock generator 27, and the galvanometer driver 32 serves as an additional element of the scanning arrangement. This additional element may alternatively be called a partial scanning arrangement or section.

Reviewing the control arrangement, it is possible to understand as follows. The clock generating unit additionally generates the swinging clock pulses Q(3) as the sampling pulses in an interlaced relationship to the switching clock pulses Q(2). In the gating unit, the analog-to-digital converter 28 uses the sampling pulses in sampling the detection signal into the digital intensity signal S(1) representative of the variable beam intensity. Furthermore, a combination of the comparator 29 and the gate circuit 31 serves as a partial gating unit which is for gating the switching clock pulses Q(2) into the activating pulses Q(4) only when the digital intensity signal S(1) represents the variable beam intensity as greater than the threshold beam intensity.

Turning temporarily to FIG. 5 and continuing reference to FIG. 1, a pattern "A" is exemplified, on an xy coordinate plane defining x-axis and y-axis directions, as an original pattern for use in machining the object surface of the object 14. It will be surmised that the original pattern is considerably wider than the total size of the liquid crystal display panel 18. The original pattern is therefore divided into a plurality of pattern blocks which can be displayed on the liquid crystal display panel 18 one at a time. In the example being illustrated, the pattern blocks are numbered stepwise in the y-axis direction, from No. 1 to No. 4 forwardly along the x-axis direction, from No. 5 to No. 8 backwardly along the x-axis direction; and so forth.

Turning back to FIGS. 1, 3, and 4 with reference to FIG. 5 continued, an image scanner 36 is for optically scanning the original pattern exemplified in FIG. 5. The image scanner 36 produces a binary pattern signal representative of the original pattern. The controller 26 comprises a pattern memory (not shown) accessible by a combination of x-axis and y-axis address signals which an address generator (not shown) generates in the controller 26. Supplied from the image scanner 36, the binary pattern signal is stored in the pattern memory. Alternatively, the pattern memory is supplied with a like pattern signal either from a computer 37 or from a computer aided design (CAD) device which the computer 37 may comprise.

By using the address generator, the controller 26 reads the pattern memory, from a picture element of the liquid crystal display panel 18 to another picture element of the liquid crystal display panel 18 to another picture element, to produce a read pattern signal S(4) which represents at first the No. 1 pattern block. Supplied with the read pattern signal from the pattern memory of the controller 26, a liquid crystal display driver 38 makes the liquid crystal display panel 18 display the No. 1 pattern block as the position reference pattern. It is now understood that a combination of the controller 26 together with its pattern memory and address generator, the clock generator 27, and the liquid crystal display driver 38 serves as an additional element of the displaying arrangement.

After the liquid crystal display panel 18 is made to display the position reference pattern representative of the No. 1 pattern block, the galvanometer scanner 13 is swung to an initial angular position by supplying the initial count to the galvanometer driver 32. At the initial angular position, the machining beam spot should be placed on the object surface of the object 14 at an X-axis position from which machining of the object surface should start if no attention is directed to a Y-axis position of the object surface.

The Y drive motor 25 is put into operation to make the machining beam spot fall at the Y-axis position as well as at the X-axis position. While the Y drive motor 25 is caused to momentally stop, the position reference pattern is scanned along a line of scan. The machining beam spot scans the object surface along a line of machining. The Y drive motor 25 is used to give the unit displacement to the object 14. The position reference beam spot is caused to scan another line of scan in a backward direction. In this manner, a raster scan is carried out on the object surface to complete machining of the object surface in accordance with the machining pattern which is identical with the position reference pattern.

After completion of machining in compliance with the position reference pattern representative of the No. 1 pattern block, the position reference pattern is renewed to represent the No. 2 pattern block. Repeating such procedures, the laser machining device machines the object surface in accordance with the original pattern.

Reviewing FIGS. 1 through 5, it is possible to use the laser machining device in manufacturing a laser marker in which the machining and the position reference condenser lenses 12 and 17 have a comon focal length of 150 mm, each of the first and the second distances L1 and L2 is equal to 100 mm, and the galvanometer scanner 13 can make the machining beam spot scan the object surface of the object 14 in a range of plus 5 mm and minus 5 mm in the X-axis direction. In the laser marker, the machining beam spot scans the object surface in an optional range in the Y-axis direction. The optional range may be equal to, for example, 100 mm.

When the first and the second distances L1 and L2 are different from each other, the position reference pattern can be transferred into the machining pattern on either an enlarged or a reduced scale in the X-axis direction. The position reference pattern can, however, be neither enlarged or reduced into the machining pattern in the Y-axis direction.

When the position reference pattern is transferred into the machining pattern with neither a scale enlargement nor a scale reduction in the manner described above, the pattern transfer is scarcely adversely affected either by hysteresis, a position drift, or both of the galvanometer scanner 13. In addition, the pattern trasfer is carried out with a precision which depends on positional relationship among the galvanometer scanner 13, the object 14, and the liquid crystal display panel 18. The pattern transfer is therefore stable. It should, however, be noted that aberration is inevitable in the machining and the position reference condenser lenses 12 and 17. The aberration results in differences between the sizes of the machining and the position reference beam spots and between speeds at which the machining and the position reference beam spots scan the object surface of the object 14 and the position reference pattern displayed on the liquid crystal display panel 18 even when the galvanometer scanner 13 is given a common unit angle of swing by each of the swinging clock pulses Q(3) irrespective of its angular position. It is, however, readily possible to get rid of the differences by combining an aberration compensating lens with each of the machining and the position reference condenser lenses 12 and 17. When each of the first and the second distances L1 and L2 is sufficiently greater than the range of scan of the machining or the position reference beam spots, the compensating lens is unnecessary.

Figure 6:
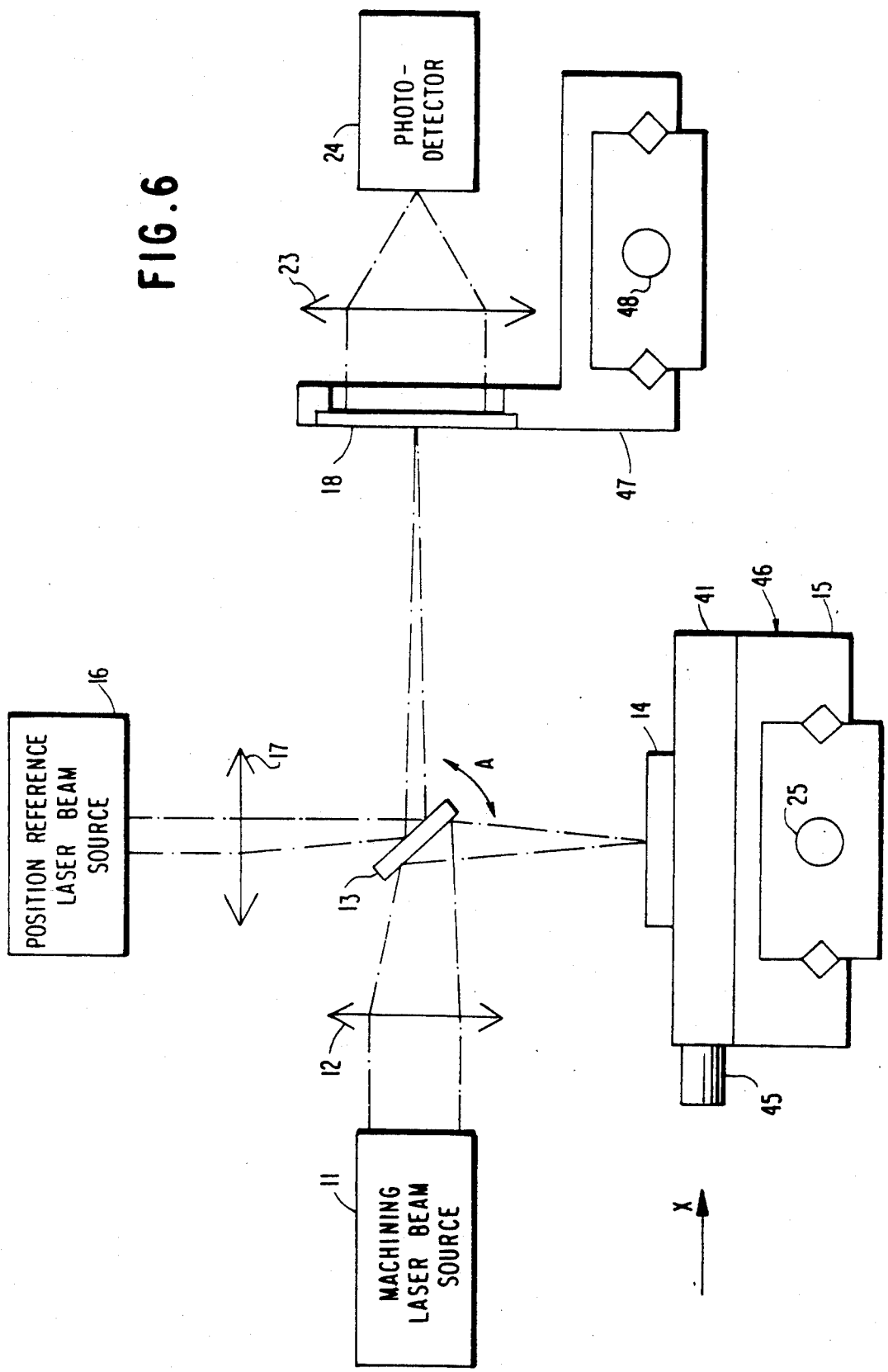
FIG. 6 is a schematic side view of a laser machining device according to a second embodiment of this invention.

Referring now to FIG. 6, the description will proceed to a laser machining device according to a second embodiment of this invention. Similar parts are designated by like reference numerals and are operable with likewise named optical beams and electric signals. The galvanometer scanner 13, the block diagram, the time chart, and division into the pattern blocks are applicable to the laser machining device of FIG. 6 with no change from those illustrated with reference to FIGS. 2 through 5.

It is to be noted that the galvanometer scanner 13 and the object 14 are carried, among others, by an X table 41 carried in turn by the above-mentioned Y table, which will hereafter be referred to simply as a Y table 15 as before. The X table 41 is driven by an X drive motor 45 in the X-axis direction. A combination of the X and the Y tables 41 and 15 serves as an XY stage 46 and is fed in the Y-axis direction by the Y drive motor, which will afresh be called a main Y drive motor and is designated by the reference numeral 25 as above. The liquid crystal display panel 18 is carried by a Y stage 47 driven in the Y-axis direction by a separate Y drive motor 48 independently of drive of the XY stage 46 by the main Y drive moter 25.

In FIG. 6, the laser machining device is somewhat complicated in structure as compared with that illustrated with reference to FIG. 1. The example being illustrated is, however, advantageous in that it is possible to transfer the position reference pattern to the machining pattern with either an enlargement or a reduction in scale by selecting a ratio of the first distance L1 to the second distance L2 and by accordingly selecting a ratio of the speed of feed of the Y stage 47 to the speed of feed of the XY stage 46 in the Y-axis direction.

Reviewing FIGS. 1 through 6, it is possible to transfer the position reference pattern to the machining pattern with either an enlargement or a reduction in scale by scrolling the position reference pattern on the liquid crystal display panel 18 in proportion to the speed of feed of the object 14 in the Y-axis direction. The enlargement and the reduction can likewise be achieved by making the liquid crystal display panel 18 display the position reference pattern on a selected scale of enlargement or reduction. The laser machining device is therefore applicable to a pattern generator for use in manufacturing reticles, where it is necessary to transfer the position reference pattern onto the object surface as the machining pattern with a high resolving power which is higher than that of the liquid crystal display panel 18. For example, this resolving power becomes equal to 0.1 mm when a half of the first distance L1 is selected as the second distance L2 with the picture element size of 0.2 mm square used. Incidentally, it is believed that the controller 26 is readily made and used by one skilled in the art.

A conventional laser machining device may be of a variable slit type. It is difficult with this laser machining device to machine the object surface in an optionally complicated pattern. In contrast, the laser machining device according to this invention is capable of using a complicated position reference pattern in machining the object surface in an accordingly complicated machining pattern and, in the manner described in conjunction with FIG. 5, in a wide range of area.

It is possible according to this invention to use the machining laser beam and the position reference laser beam of different wavelengths in addition to a difference in power. For example, the machining laser beam source 11 may comprise either a Nd;YAG laser oscillator of the machining beam wavelength of about 1.06 microns or an excimer laser oscillator of the machining beam wavelength of an ultraviolet wavelength. The position reference laser beam source 16 may comprise either a He:Ne laser oscillator or a laser diode. Alternatively, the machining and the position reference beam wavelengths may be equal to each other.

Display of the position reference pattern on the liquid crystal display panel 18 enables to give a high machining speed to the laser machining device according to this invention. Use of the photodetector 24 in pulse excitation of the machining laser beam source 11 enables attainment of not only the high machining speed but also stable machining.

While this invention has thus far been described in specific conjunction with only two preferred embodiments thereof, it will now be readily possible for one skilled in the art to carry this invention into effect in various other manners. For example, the object 14 may have a curved surface for laser beam treatment. The table 15 or 41 may be a cylindrical one. The above-mentioned first and second optical axes may form an angle which is different from 90° of angle. It is necessary that the switching clock pulses Q(2) and the swinging clock pulses Q(3) or the sampling pulses should have an interlaced relationship. In other respects, the clock frequencies are optional. The device clock pulses Q(1) may have a higher clock frequency than 10 kHz. The activating pulses Q(4) may have as high a clock frequency as 50 kHz.

What is claimed is:

1. A laser machining device for machining an object by a machining laser beam, comprising:
    a machining laser beam source for controllably generating said machining laser beam;
    a position reference laser beam source for generating a position reference laser beam;
    displaying means for displaying a position reference pattern for allowing passage of said position reference laser beam with a variable beam intensity;
    scanning means for scanning said object by said machining laser beam and said position reference pattern by said position reference laser beam so that said object is scanned at a machining position corresponding to a reference position at which said position reference laser beam is incident on said position reference pattern and through which said position reference laser beam passes to become an intensity variable laser beam having said variable beam intensity;
    a photodetector for detecting said intensity variable laser beam to produce a detection signal representative of said variable beam intensity; and
    control means supplied with said detection signal for controlling said machining laser beam source to make said machining laser beam source generate said machining laser beam when said variable beam intensity is greater than a threshold beam intensity.

2. A laser machining device as claimed in claim 1, wherein said scanning means comprises:
    a galvanometer scanner having first and second reflecting surfaces which are parallel to each other and are for reflecting said machining and said position reference laser beams; and
    partial scanning means for swinging said galvanometer scanner so that said object is scanned at said machining position by said machining laser beam and that said position reference pattern is scanned at said reference position by said position reference laser beam.

3. A laser machining device as claimed in claim 2, wherein:
    said machining laser beam source is for directing said machining laser beam to said first reflecting surface along a first optical axis;
    said position reference laser beam source directing said position reference laser beam to said second reflecting surface along a second optical axis which is substantially perpendicular to said first optical axis;
    said galvanometer scanner directing said machining laser beam from said first reflecting surface to said object substantially parallel to said second optical axis and said position reference laser beam from said second reflecting surface to said position reference pattern substantially parallel to said first optical axis.

4. A laser machining device as claimed in claim 1, wherein said control means comprises:
    clock generating means for generating a sequence of clock pulses;
    gating means supplied with said detection signal for gating said clock pulses to produce an intermittent sequence of activating pulses only when said variable beam intensity is greater than said threshold beam intensity; and
    supply means for supplying said activation pulses to said machining laser beam source to make said machining laser beam source generate pulses of said machining laser beam in synchronism with said activating pulses.

5. A laser machining device as claimed in claim 4, wherein:
    said clock generating means is for additionally generating sampling pulses in an interlaced relationship to said clock pulses;
    said gating means comprising:
    an analog-to-digital converter for using said sampling pulses in sampling said detection signal into a digital intensity signal representative of said variable beam intensity; and
    partial gating means for gating said clock pulses into said activating pulses only when said digital intensity signal represents the variable beam intensity to be greater than said threshold beam intensity.

* * * * *

UNITED STATES PATENT AND TRADEMARK OFFICE
CERTIFICATE OF CORRECTION

PATENT NO. : 5,191,187
DATED : March 2, 1993
INVENTOR(S) : Toshikazu Kajikawa

It is certified that error appears in the above-indentified patent and that said Letters Patent is hereby corrected as shown below:

Col. 6, line 49, delete "11" and insert --L1--.

Signed and Sealed this

Fourth Day of January, 1994

Attest:

BRUCE LEHMAN

Attesting Officer · Commissioner of Patents and Trademarks